United States Patent
Tan et al.

(10) Patent No.: US 10,728,162 B2
(45) Date of Patent: Jul. 28, 2020

(54) METHOD AND APPARATUS FOR CONTROLLING SERVICE DATA FLOW

(71) Applicant: HUAWEI TECHNOLOGIES CO., LTD., Shenzhen (CN)

(72) Inventors: Shiyong Tan, Beijing (CN); Hui Cai, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 203 days.

(21) Appl. No.: 15/381,750

(22) Filed: Dec. 16, 2016

(65) Prior Publication Data
US 2017/0099230 A1     Apr. 6, 2017

Related U.S. Application Data

(63) Continuation of application No. PCT/CN2014/080226, filed on Jun. 18, 2014.

(51) Int. Cl.
*H04L 12/801* (2013.01)
*H04L 12/741* (2013.01)

(52) U.S. Cl.
CPC .............. *H04L 47/35* (2013.01); *H04L 45/54* (2013.01); *H04L 47/33* (2013.01)

(58) Field of Classification Search
CPC .......... H04L 45/54; H04L 47/33; H04L 47/35
See application file for complete search history.

(56) References Cited

U.S. PATENT DOCUMENTS

| | | | | |
|---|---|---|---|---|
| 7,042,884 B2* | 5/2006 | Huang | .................... | H04L 45/04 370/395.54 |
| 7,143,188 B2* | 11/2006 | Maufer | ................... | H04L 29/06 709/245 |

(Continued)

FOREIGN PATENT DOCUMENTS

| | | |
|---|---|---|
| CN | 102301663 | 12/2011 |
| CN | 102970242 | 3/2013 |

(Continued)

OTHER PUBLICATIONS

Maeda, Shigeaki, *The A to Z of SDN Software Defined Networking*, vol. 11, No. 602, Nikkei Communications, Nikkei Business Publications, Inc., Mar. 2014 March, pp. 54-59.

(Continued)

*Primary Examiner* — Asad M Nawaz
*Assistant Examiner* — Kai Chang
(74) *Attorney, Agent, or Firm* — Womble Bond Dickinson (US) LLP (57) ABSTRACT

Embodiments of the present invention provide a method and an apparatus for controlling a service data flow. The method includes: acquiring, by a controller, index information related to a UE, where the index information includes at least a user information index, a PDN connection index, a bearer index, and a service data flow table index that are related to the UE; sending, by the controller, the index information to a forwarder by using an entry notification message; when a first control event of a service data flow is triggered, acquiring, by the controller, a first instruction index according to the first control event, where the first instruction index includes at least one type of the index information related to the UE; and sending, by the controller, the first instruction index to the forwarder by using first control signaling.

8 Claims, 6 Drawing Sheets

(56) References Cited

U.S. PATENT DOCUMENTS

| | | | |
|---|---|---|---|
| 8,792,876 B1* | 7/2014 | Zhu | H04L 12/4641 370/338 |
| 9,203,748 B2 | 12/2015 | Jiang et al. | |
| 10,003,529 B2* | 6/2018 | Zhang | H04L 45/302 |
| 2003/0067876 A1* | 4/2003 | Sharma | H04L 49/1523 370/232 |
| 2005/0164705 A1* | 7/2005 | Rajkotia | H04W 68/00 455/436 |
| 2005/0195781 A1* | 9/2005 | Ikeda | H04W 48/12 370/338 |
| 2007/0280115 A1 | 12/2007 | Meyer et al. | |
| 2009/0182836 A1* | 7/2009 | Aviles | H04L 41/0893 709/213 |
| 2010/0234039 A1* | 9/2010 | Kwon | H04W 48/12 455/452.2 |
| 2010/0260181 A1* | 10/2010 | Chang | H04L 69/32 370/390 |
| 2011/0032819 A1* | 2/2011 | Schliwa-Bertling | H04L 47/10 370/229 |
| 2011/0238821 A1* | 9/2011 | Matsuo | H04L 43/0876 709/224 |
| 2012/0087313 A1* | 4/2012 | Yin | H04W 48/16 370/328 |
| 2012/0099597 A1* | 4/2012 | Dong | H04L 41/0803 370/392 |
| 2012/0258716 A1* | 10/2012 | Ahn | H04W 88/06 455/436 |
| 2013/0142073 A1 | 6/2013 | Shikitani | |
| 2013/0177016 A1* | 7/2013 | Nakano | H04L 45/38 370/389 |
| 2013/0294249 A1* | 11/2013 | Lin | H04L 43/028 370/236 |
| 2013/0322440 A1* | 12/2013 | Chiba | H04L 49/3009 370/389 |
| 2014/0016647 A1* | 1/2014 | Yoshida | H04L 12/4666 370/395.53 |
| 2014/0119189 A1 | 5/2014 | Lin | |
| 2014/0153572 A1* | 6/2014 | Hampel | H04L 12/6418 370/392 |
| 2014/0177634 A1* | 6/2014 | Jiang | H04L 45/64 370/392 |
| 2014/0233577 A1* | 8/2014 | Hatano | H04L 45/64 370/400 |
| 2014/0314088 A1* | 10/2014 | Li | H04W 28/06 370/392 |
| 2015/0009830 A1* | 1/2015 | Bisht | H04L 47/125 370/236 |
| 2015/0103743 A1* | 4/2015 | Tamura | H04W 40/02 370/328 |
| 2015/0117202 A1* | 4/2015 | Bhagavathiperumal | H04L 47/10 370/235 |
| 2015/0163146 A1* | 6/2015 | Zhang | H04L 47/125 370/238 |
| 2015/0201400 A1* | 7/2015 | Yin | H04W 68/02 370/329 |
| 2015/0327129 A1* | 11/2015 | Faccin | H04W 36/0055 370/331 |
| 2015/0341235 A1* | 11/2015 | Ni | H04W 24/00 370/392 |
| 2015/0372905 A1* | 12/2015 | Hu | H04L 67/104 370/389 |
| 2015/0373584 A1* | 12/2015 | Hong | H04W 28/08 370/329 |
| 2016/0006650 A1* | 1/2016 | Song | H04L 12/6418 370/329 |
| 2016/0080253 A1* | 3/2016 | Wang | H04L 12/6418 370/392 |
| 2016/0087905 A1* | 3/2016 | Liu | H04L 67/32 370/236 |
| 2016/0099868 A1* | 4/2016 | Tan | H04L 12/6418 370/392 |
| 2016/0261492 A1* | 9/2016 | Xiao | H04L 41/0686 |
| 2016/0294686 A1* | 10/2016 | Hu | H04L 12/6418 |
| 2017/0026274 A1* | 1/2017 | Wang | H04L 12/6418 |
| 2017/0079075 A1* | 3/2017 | Han | H04W 76/10 |

FOREIGN PATENT DOCUMENTS

| | | |
|---|---|---|
| CN | 103051629 | 4/2013 |
| CN | 103368851 | 10/2013 |
| CN | 103379039 | 10/2013 |
| EP | 1353483 A2 | 10/2003 |
| EP | 1418715 A1 | 5/2004 |
| EP | 2426956 A1 | 3/2012 |
| EP | 2613493 | 7/2013 |
| EP | 2733908 A1 | 5/2014 |
| WO | 97/34419 | 9/1997 |
| WO | WO2012049807 | 4/2012 |
| WO | WO2012133060 | 10/2012 |
| WO | WO2013179542 | 12/2013 |
| WO | WO2014085207 | 6/2014 |

OTHER PUBLICATIONS

Said, Siwar Ben Hadj et al., *New Control Plane in 3GPP LTE/EPC Architecture for On-Demand Connectivity Service*, 2013 IEEE 2nd International Conference on Cloud Networking (CloudNet), Nov. 11, 2013 (6 pp.).

Notice of Reasons for Rejection, dated Feb. 20, 2018, in Japanese Application No. 2016-573847 (6 pp.).

International Search Report dated Mar. 31, 2015 in corresponding Application No. PCT/CN2014/080226.

International Search Report dated Mar. 31, 2015 in corresponding International Patent Application No. PCT/CN2014/080226.

3rd Generation partnership Project, "Technical Specification Group Services and System Aspects, General Packet Radio Service (GPRS), Service Description", 3 GPP TS 23.060, v12. 4.0, Mar. 2014.

Office Action, dated Apr. 3, 2018, in Chinese Application No. 201480043424.4 (5 pp.).

Extended European Search Report dated Jun. 22, 2017 in corresponding European Patent Application No. 14895484.5.

\* cited by examiner

METHOD AND APPARATUS FOR CONTROLLING SERVICE DATA FLOW

CROSS-REFERENCE TO RELATED APPLICATIONS

This application is a continuation of International Application No. PCT/CN2014/080226, filed on Jun. 18, 2014, the disclosure of which is hereby incorporated by reference in its entirety.

TECHNICAL FIELD

The present invention relates to the field of communications technologies, and in particular, to a method and an apparatus for controlling a service data flow.

BACKGROUND

With the development of communications technologies, a software-defined network (SDN) technology emerges, and is generally believed to represent a development trend of a future network. The technology can decouple control logic of a network element from a forwarding function of the network element, and deploys, in a centralized manner, the control logic to a controller, so as to improve efficiency in managing a network.

The Openflow protocol is a typical technology in an SDN network; in the protocol, an operation is performed, based on a granularity of a data flow, on a packet, and different processing manners may be used for different service data flows. The controller is responsible for determining, according to a feature (e.g. flow matching information) of a packet, a forwarding action of the service flow, and delivering a corresponding flow rule (including flow matching information and a corresponding execution action) to a forwarder. The forwarder stores the flow rule, and executes a corresponding action on a subsequent packet that conforms to the flow rule.

It is found that the prior art has the at least following problems:

A service object of a current mobile network is a user, and a user equipment (UE) of a user may be corresponding to multiple service data flows. A service data flow of the mobile network has an aggregation management requirement for multiple granularities such as a bearer granularity and a public data network (PDN) connection granularity. However, for a manner in the current Openflow of performing an operation on a packet based on a data flow, control of the service data flow of the multiple granularities can be completed only by using control information with multiple data flow granularities, which increases link overheads and has low control efficiency.

SUMMARY

In order to solve defects of the prior art, embodiments of the present invention provide a method and apparatus for controlling a service data flow. The technical solutions are as follows:

According to a first aspect, a method for controlling a service data flow includes:

acquiring, by a controller, index information related to a user equipment (UE), where the index information includes at least a user information index, a public data network (PDN) connection index, a bearer index, and a service data flow table index that are related to the UE;

sending, by the controller, the index information to a forwarder by using an entry notification message;

when a first control event of a service data flow is triggered, acquiring, by the controller, a first instruction index according to the first control event, where the first instruction index includes at least one type of the index information related to the UE; and sending, by the controller, the first instruction index to the forwarder by using first control signaling.

In a first possible implementation manner of the first aspect, the first control event includes at least one of: a control event for user information, a control event for a PDN connection, a control event for a bearer, a control event for a service data flow, and a control event for a 5-tuple data flow table that are related to the UE.

In a second possible implementation manner of the first aspect, after the sending the index information to the forwarder by using an entry notification message, the method further includes:

receiving, by the controller, the index information, returned by the forwarder, of an index number allocated by the forwarder.

In a third possible implementation manner of the first aspect, the sending the index information to a forwarder by using an entry notification message includes:

storing the index information in a preset field of the entry notification message, and sending the entry notification message to the forwarder, where the preset field is a newly added field or a cookie field; or storing the index information in an action field of the entry notification message, and sending the entry notification message to the forwarder.

In a fourth possible implementation manner of the first aspect, after the sending the first instruction index to the forwarder by using first control signaling, the method further includes:

receiving, by the controller, response information returned by the forwarder, where the response information carries an operation result corresponding to the first control signaling, and the first instruction index.

In a fifth possible implementation manner of the first aspect, after the sending the index information to the forwarder, the method further includes:

receiving, by the controller, second control signaling sent by the forwarder, where the second control signaling carries a second instruction index, and the second instruction index includes at least one type of the index information related to the UE.

According to a second aspect, a method for controlling a service data flow includes:

receiving, by a forwarder, an entry notification message that carries index information related to a UE and is sent by a controller, where the index information includes at least a user information index, a PDN connection index, a bearer index, and a service data flow table index that are related to the UE;

receiving, by the forwarder, first control signaling sent by the controller, where the first control signaling carries a first instruction index, and the first instruction index includes at least one type of the index information related to the UE; and performing, by the forwarder, a control operation on a service data flow according to the first instruction index.

In a first possible implementation manner of the second aspect, the receiving, by a forwarder, an entry notification message that carries index information related to a UE and is sent by a controller includes:
- receiving the entry notification message sent by the controller, and extracting index information from a preset field of the entry notification message, where the preset field is a newly added field or a cookie field; or
- receiving the entry notification message sent by the controller, and extracting index information from an action field of the entry notification message.

In a second possible implementation manner of the second aspect, after the forwarder performs a control operation on a service data flow with a corresponding control granularity according to the first instruction index, the method further includes:
- returning, by the forwarder, response information to the controller, where the response information carries an operation result corresponding to the first control signaling, and the first instruction index.

In a third possible implementation manner of the second aspect, after the receiving, by a forwarder, an entry notification message that carries index information related to a UE and is sent by a controller, the method further includes:
- when a second control event of a service data flow is triggered, acquiring, by the forwarder, a second instruction index according to the second control event, and sending the second instruction index to the controller by using second control signaling, where the second instruction index includes at least one type of the index information related to the UE.

In a fourth possible implementation manner of the second aspect, after the receiving, by a forwarder, an entry notification message that carries index information related to a UE and is sent by a controller, the method further includes:
- allocating, by the forwarder, an index number for each index in the index information according to index numbers of various indexes stored in the forwarder; and
- returning, by the forwarder to the controller, the index information of the index number allocated by the forwarder.

In a fifth possible implementation manner of the second aspect, the index information further includes: a 5-tuple data flow table index.

According to a third aspect, a controller for controlling a service data flow includes:
- a first acquisition module, configured to acquire index information related to a UE, where the index information includes at least a user information index, a PDN connection index, a bearer index, and a service data flow table index that are related to the UE;
- a first sending module, configured to send the index information to a forwarder by using an entry notification message;
- a second acquisition module, configured to: when a first control event of a service data flow is triggered, acquire a first instruction index according to the first control event, where the first instruction index includes at least one type of the index information related to the UE and acquired by the first acquisition module; and
- a second sending module, configured to send the first instruction index to the forwarder by using first control signaling.

In a first possible implementation manner of the third aspect, the first control event includes at least one of: a control event for user information, a control event for a PDN connection, a control event for a bearer, a control event for a service data flow, and a control event for a 5-tuple data flow table that are related to the UE.

In a second possible implementation manner of the third aspect, the controller further includes:
- a first receiving module, configured to receive the index information, returned by the forwarder, of an index number allocated by the forwarder.

In a third possible implementation manner of the third aspect, the first sending module includes:
- a first sending unit, configured to store the index information in a preset field of the entry notification message, and send the entry notification message to the forwarder, where the preset field is a newly added field or a cookie field; and
- a second sending unit, configured to store the index information in an action field of the entry notification message, and send the entry notification message to the forwarder.

In a fourth possible implementation manner of the third aspect, the controller further includes:
- a second receiving module, configured to receive response information returned by the forwarder, where the response information carries an operation result corresponding to the first control signaling, and the first instruction index.

In a fifth possible implementation manner of the third aspect, the controller further includes:
- a third receiving module, configured to receive second control signaling sent by the forwarder, where the second control signaling carries a second instruction index, and the second instruction index includes at least one type of the index information related to the UE.

According to a fourth aspect, a forwarder for controlling a service data flow includes:
- a fourth receiving module, configured to receive an entry notification message that carries index information related to a UE and is sent by a controller, where the index information includes at least a user information index, a PDN connection index, a bearer index, and a service data flow table index that are related to the UE;
- a fifth receiving module, configured to receive first control signaling sent by the controller, where the first control signaling carries a first instruction index, and the first instruction index includes at least one type of the index information related to the UE; and
- a control module, configured to perform a control operation on a service data flow according to the first instruction index.

In a first possible implementation manner of the fourth aspect, the fourth receiving module includes:
- a first receiving unit, configured to receive an entry notification message sent by the controller, and extract index information from a preset field of the entry notification message, where the preset field is a newly added field or a cookie field; or
- a second receiving unit, configured to receive an entry notification message sent by the controller, and extract index information from an action field of the entry notification message.

In a second possible implementation manner of the fourth aspect, the forwarder further includes:
- a first returning module, configured to return response information to the controller, where the response information carries an operation result corresponding to the first control signaling, and the first instruction index.

In a third possible implementation manner of the fourth aspect, the forwarder further includes:
- a third sending module, configured to: when a second control event of a service data flow is triggered, acquire a second instruction index according to the second control event, and send the second instruction index to the controller by using second control signaling, where the second instruction index includes at least one type of the index information related to the UE.

In a fourth possible implementation manner of the fourth aspect, the forwarder further includes:

an allocation module, configured to allocate, an index number for each index in the index information according to index numbers of various indexes stored in the forwarder; and a second returning module, configured to return, to the controller, the index information of the index number allocated by the forwarder.

In a fifth possible implementation manner of the fourth aspect, the index information further includes: a 5-tuple data flow table index.

According to a fifth aspect, a controller is provided, where the controller includes: a processor, a receiver, and a transmitter, where the receiver is configured to receive index information reported by a UE and related to the UE, where the index information includes at least a user information index, a public data network (PDN) connection index, a bearer index, and a service data flow table index that are related to the UE;

the processor is configured to: generate, according to the index information related to the UE and received by the receiver, an entry notification message; and when a first control event of a service data flow is triggered, acquire a first instruction index according to the first control event, where the first instruction index includes at least one type of the index information related to the UE; and the transmitter is configured to: send the entry notification message to a forwarder; and send the first instruction index to the forwarder by using first control signaling.

According to a sixth aspect, a forwarder is provided, where the forwarder includes: a processor and a receiver, where the receiver is configured to: receive an entry notification message that carries index information related to a UE and is sent by a controller, where the index information includes at least a user information index, a PDN connection index, a bearer index, and a service data flow table index that are related to the UE; and receive first control signaling sent by the controller, where the first control signaling carries a first instruction index, and the first instruction index includes at least one type of the index information related to the UE; and the processor is configured to perform a control operation on a service data flow according to the first instruction index.

Beneficial effects of the technical solutions provided in the embodiments of the present invention are as follows:

A controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
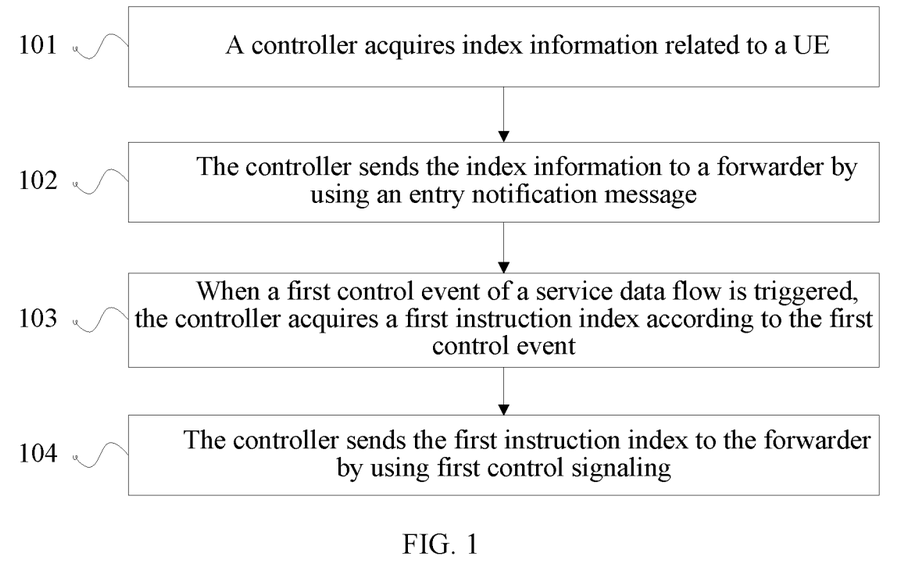
FIG. 1 is a flowchart of a method for controlling a service data flow according to Embodiment 1 of the present invention.

This embodiment of the present invention provides a method for controlling a service data flow. Referring to FIG. 1, the method includes the following contents.

101. A controller acquires index information related to a UE, where the index information includes at least a user information index, a public data network (PDN) connection index, a bearer index, and a service data flow table index that are related to the UE.

102. The controller sends the index information to a forwarder by using an entry notification message.

103. When a first control event of a service data flow is triggered, the controller acquires a first instruction index according to the first control event, where the first instruction index includes at least one type of the index information related to the UE.

104: The controller sends the first instruction index to the forwarder by using first control signaling.

In this embodiment of the present invention, a controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

Embodiment 2

Figure 2:
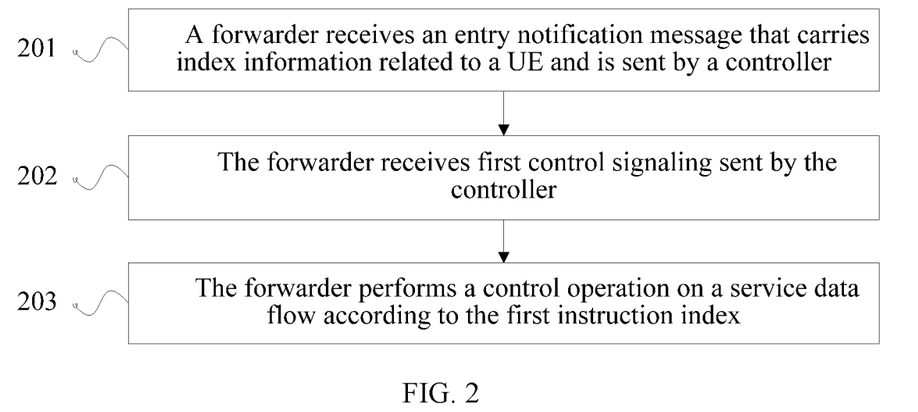
FIG. 2 is a flowchart of a method for controlling a service data flow according to Embodiment 2 of the present invention.

This embodiment of the present invention provides a method for controlling a service data flow. Referring to FIG. 2, the method includes the following contents.

201. A forwarder receives an entry notification message that carries index information related to a UE and is sent by a controller, where the index information includes at least a user information index, a PDN connection index, a bearer index, and a service data flow table index that are related to the UE.

202. The forwarder receives first control signaling sent by the controller, where the first control signaling carries a first instruction index, and the first instruction index includes at least one type of the index information related to the UE.

203. The forwarder performs a control operation on a service data flow according to the first instruction index.

In this embodiment of the present invention, a controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

Embodiment 3

Figure 3:
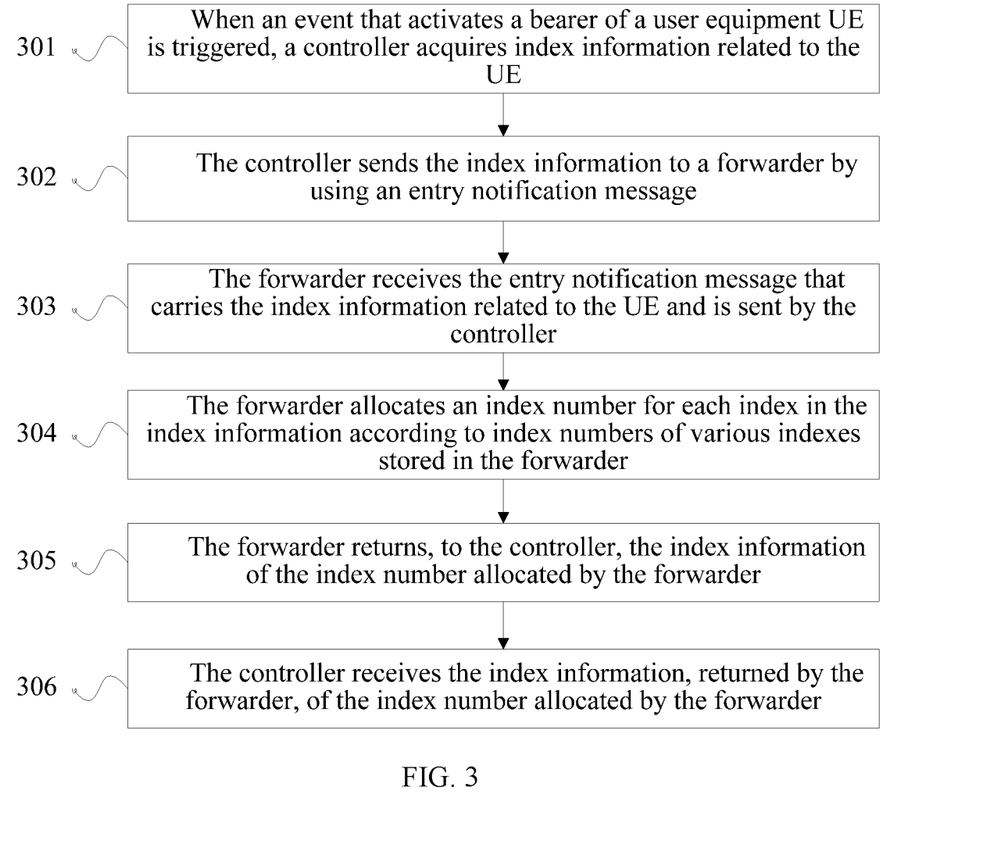
FIG. 3 is a flowchart of a method for delivering an index to a forwarder by a controller in a method for controlling a service data flow according to Embodiment 3 of the present invention.

This embodiment of the present invention provides a method for delivering an index to a forwarder by a controller in a method for controlling a service data flow. Refer to FIG. 3.

This embodiment of the present invention describes, by using a network, which uses the Openflow protocol, in an SDN network, that a controller delivers an index to a forwarder.

The method includes the following contents.

301. When an event that activates a bearer of a user equipment (UE) is triggered, a controller acquires index information related to the UE, where the index information includes at least a user information index, a public data network (PDN) connection index, a bearer index, and a service data flow table index that are related to the UE.

Specifically, the event, which activates the bearer of the user equipment (UE), in this embodiment of the present invention is the same as an event, which activates a bearer of a user equipment (UE), in a controller in the prior art, and details are not described herein. For example, when a UE attaches to a network, an event that activates a bearer of the user equipment (UE) is triggered.

A control entry of five levels is pre-established in the controller, and correspondences between entries of levels, and indexes in the entry are saved in the controller.

Levels of a five-level entry separately is: a user information table, a PDN connection table, a bearer table, a service data flow table, and a 5-tuple data flow table. Indexes allocated by the controller are as follows: a user information index, i.e. UE Index-C; a PDN index, i.e. PDN Index-C; a bearer index, i.e. Bearer Index-C; a service data flow index, i.e. SDF Index-C; and a 5-tuple data flow table index, i.e. FD Index-C.

Each UE in the user information table is corresponding to one user information index, each user information index is separately corresponding to one or more PDN indexes, one PDN index is separately corresponding to one or more bearer indexes, one bearer index is corresponding to one or more service data flow indexes, and one service data flow index is corresponding to one or more 5-tuple data flow indexes. A group of indexes, that is, a user information index, a PDN index, a bearer index, a service data flow index, and a 5-tuple data flow index that are related to each UE may be collectively referred to as index information related to the UE.

Figure 4:
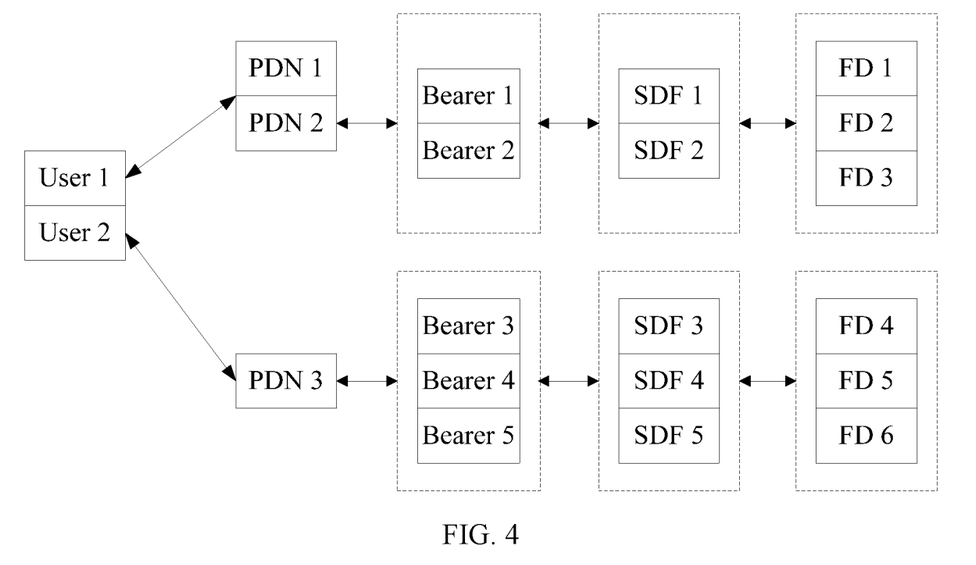
FIG. 4 is a tree-like structural diagram of index information in a method for controlling a service data flow according to Embodiment 3 of the present invention.

As shown in FIG. 4, FIG. 4 is a tree-like structural diagram of index information, that is, a tree-like structural diagram of index information corresponding to User1 and User2 in a five-level entry, where the User1 is corresponding to a PDN1 and a PDN2, the PDN2 is corresponding to a Bearer1 and a Bearer2, the Bearer1 is corresponding to an SDF1 and an SDF2, and the SDF1 is corresponding to an FD1, an FD2, and an FD3; the User2 is corresponding to a PDN3, the PDN3 is corresponding to a Bearer3, a Bearer4, and a Bearer5, the Bearer3 is corresponding to an SDF3, an SDF4, and an SDF5, and the SDF3 is corresponding to an FD4, an FD5, and an FD6.

The user information table stores user-level information, for example, an identity of a user (for example, an international mobile subscriber identity (IMSI)), and UE-AMBR bandwidth control information of a user. A User ID identity is used, where the identity uniquely identifies a user table, and may be an IMSI or the like.

The PDN information table stores PDN connection-level information, for example, an IP address, or APN-AMBR bandwidth control information. A PDN identifier, for example a PDN ID, uniquely identifies a PDN connection table of a user.

The bearer information table stores user bearer-level information, for example, QoS control or charging control of a bearer level. A bear identifier, for example a Bear ID, uniquely identifies a bearer table of a user.

The service data flow table stores description information and control information of service data of a user, and the service data flow herein may be aggregation of service data flows within a range, for example, service data flows within a range of an IP address segment are expressed in an IP/a Mask manner. A service data flow table identifier, for example, an SDF ID, uniquely identifies a service data flow table.

The 5-tuple data flow table stores an accurate 5-tuple match and corresponding control information of a data flow, for example, bandwidth control information and charging control information of a data flow. An accurate data flow table identifier, for example an FD ID, uniquely identifies a service data flow.

An index relationship may be mutually established between levels of the foregoing five-level entry. A compliant principle is that: the user information table is used as a root table, and is indexed downward separately to the PDN connection table, the bearer table, the service data flow table, and an accurate data flow table. Moreover, a lower-level entry also has an index of an upper-level entry, and can be indexed upward to the upper-level entry.

Preferably, only four levels of entries: the user information table, the PDN connection table, the bearer table, and the service data flow table, may be established in the controller, where the 5-tuple data flow table is invisible to the controller, and is established by the forwarder.

302. The controller sends the index information to a forwarder by using an entry notification message.

Further, in an SDN network that uses the Openflow protocol, the controller may send the index information to the forwarder in the following two manners.

Manner 1:

The index information is stored in a preset field of the entry notification message, and the entry notification message is sent to the forwarder, where the preset field is a newly added field or a cookie field.

Figure 5:
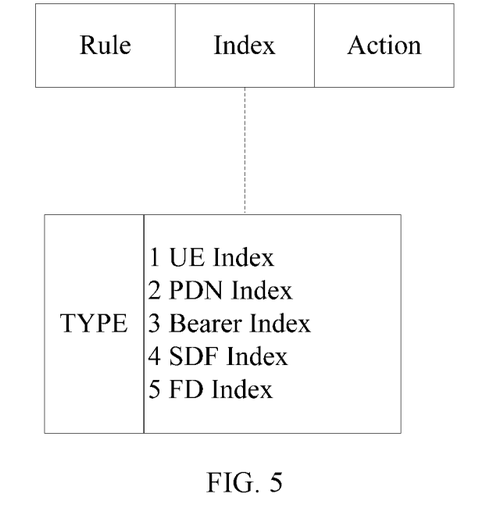
FIG. 5 is a schematic diagram of an index field added in an entry notification message in the method for controlling a service data flow according to Embodiment 3 of the present invention.

In a first case of Manner 1, an index field is added in the entry notification message. As shown in FIG. 5, FIG. 5 is a schematic diagram of an index field added in an entry notification message.

In a second case of Manner 1, specifically, a message cell of the Openflow protocol may expand a cookie field of the Openflow protocol to be in a TLV cell format, (optionally, an OF protocol cell in a TLV format may also be newly defined), a type of a carried entry (e.g. UE Index, or the like) is added in a type of Cookies, and a specific value of an index entry is carried by a Cookies Value item. Multiple Cookie values may be carried in one message, for identifying a an index relationship.

Manner 2:

A new action type is added in the Openflow protocol, the index information is stored in an action field of the entry notification message, and the entry notification message is sent to the forwarder. Multiple actions may be carried in one message, for identifying index relationships of multi-level identifies. A new action type is defined in the action field of the entry notification message, and the index information is used as a parameter of the new action type.

In addition, multiple structures of Manner 1 and Manner 2 may also be carried in one message. The forwarder is instructed to perform an operation on multiple entries.

Further, when the index information is sent, control information such as Filter information, quality of service (QoS) information, and charging may further be carried.

Preferably, the controller may notify the forwarder of the index information by using one piece of information, and may also notify the forwarder of the index information separately by using different pieces of information.

303. The forwarder receives the entry notification message that carries the index information related to the UE and is sent by the controller, where the index information includes at least the user information index, the PDN connection index, the bearer index, and the service data flow table index that are related to the UE.

In the Openflow protocol, a manner in which the forwarder receives and extracts the index information sent by the controller may be:
  receive the entry notification message sent by the controller, and extract index information from a preset field of the entry notification message, where the preset field is a newly added field or a cookie field; or
  receive the entry notification message sent by the controller, and extract index information from an action field of the entry notification message.

Further, the forwarder establishes, according to the received index information, a five-level index entry and completes installation of a flow table entry.

304. The forwarder allocates an index number for each index in the index information according to index numbers of various indexes stored in the forwarder.

After receiving the index information in step 303, the forwarder may directly install the flow table entry according to the indexes allocated by the controller. Preferably, by performing this step, the index number may also be reallocated for each index in the index information according to the index numbers of the indexes stored in the forwarder.

Indexes allocated by the forwarder are as follows: a user information index UE Index-U; a PDN index PDN Index-U; a bearer index Bearer Index-U; a service data flow index SDF Index-U; and a 5-tuple data flow index FD Index-U.

305. The forwarder returns, to the controller, the index information of the index number allocated by the forwarder.

Preferably, the forwarder may return, the index information of the reallocated index number to the controller by using one piece of information, or may return, the index information of the reallocated index number to the controller by using different pieces of information.

This step is an optional execution step. Correspondingly, when the forwarder performs this step, the controller performs step 306.

Further, the forwarder may add multiple pieces of entry control information of a same level to one piece of information. For example, the forwarder may add multiple pieces of entry control information of the UE, that is, multiple pieces of index information related to the UE, to one piece of information.

306. The controller receives the index information, returned by the forwarder, of the index number allocated by the forwarder.

The controller saves various indexes in the index information of the reallocated index number, and records a correspondence between the indexes and the indexes in the controller.

Figure 6:
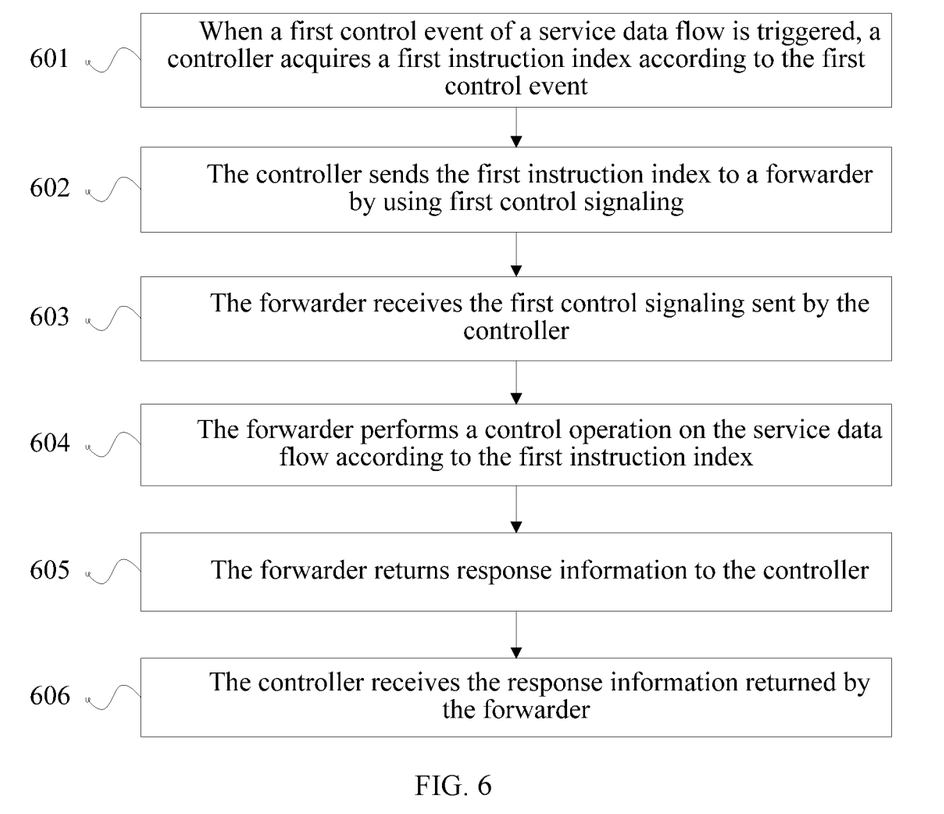
FIG. 6 is a flowchart of a method for controlling a service data flow according to Embodiment 3 of the present invention.

In this embodiment of the present invention, a method for controlling a service data flow is further provided. As shown in FIG. 6, the method includes the following contents.

601. When a first control event of a service data flow is triggered, a controller acquires a first instruction index according to the first control event, where the first instruction index includes at least one type of index information related to a UE.

The first instruction index may also include a 5-tuple data flow table index.

First control signaling may be dedicated information, or may be general information. The dedicated information may be a control instruction command corresponding to a control event, for example, the control event is deleting an entry of a UE, and the first control signaling is DELETE information. In addition, the general information may be a control instruction command that is corresponding to a control event and carried in the first control signaling, for example, the control event is deleting an entry of a UE, and the first control signaling carries a DELETE instruction command. A manner of the first control signaling is not limited herein.

A different control event is corresponding to a different instruction index.

For example: for deleting all entries under a UE, a first instruction index corresponding to the control event is: a UE Index-U;

for deleting all entries under a PDN connection of a UE, a first instruction index corresponding to the control event is: a PDN Index-U, and optionally, carries a user UE Index-U to which the PDN connection belongs;

for activatingdedicated bearers under a same PDN of a UE, a first instruction index corresponding to the control event is: a PDN Index-U and a Bearer Index-C;

for adding a Filter operation to a bearer, and a first instruction index corresponding to the control event is: a PDN Index-U, an FD Index-C, and Filter information; and for instructing a forwarding plane by a control plane to control an APN-AMBR, a first instruction index corresponding to the control event carries a PDN Index-C or a PDN Index-U, and APN-AMBR information.

602. The controller sends the first instruction index to a forwarder by using first control signaling.

603. The forwarder receives the first control signaling sent by the controller, where the first control signaling carries the first instruction index, and the first instruction index includes at least one type of the index information related to the UE.

604. The forwarder performs a control operation on the service data flow according to the first instruction index.

For the examples in step 601, a control operation may be performed on a service data flow according to different index information.

605. The forwarder returns response information to the controller, where the response information carries an operation result corresponding to the first control signaling, and the first instruction index.

For the examples in step 601, response information returned by a forwarder to a controller is that:

fordeleting all the entries under the UE, the response information carries a UE Index-C and an operation result (success, failure or the like);

for deleting all the entries under the PDN connection of the UE, the response information carries a PDN Index-C and an operation result (success, failure or the like), and optionally, carries a UE Index-C to which the PDN connection belongs;

for activating the dedicated bearers under the same PDN of the UE, the forwarder activates a bearer of the UE according to an instruction of the control plane, and associates all bearers of the UE by using the PDN Index-U, and the response information carries the PDN Index-U and a PDN Index-C;

for adding the Filter to a bearer, the forwarder adds the Filter to the bearer instructed by the control plane, and adds the FD Index-U to a first response message, and optionally, may carry bearer Index-C information; and for notifying the forwarding plane by the control plane to control the APN-AMBR, if a PDN connection is not activated, the response information carries the PDN Index-C and the APN-AMBR; or if the PDN connection has already been activated, the response information carries the PDN Index-U and the APN-AMBR.

606. The controller receives the response information returned by the forwarder, where the response information carries the operation result corresponding to the first control signaling, and the first instruction index.

Figure 7:
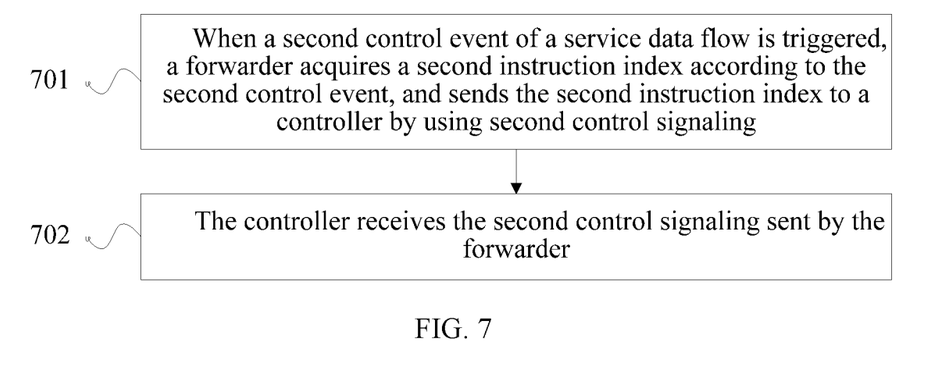
FIG. 7 is a flowchart of another method for controlling a service data flow according to Embodiment 3 of the present invention.

In this embodiment of the present invention, another method for controlling a service data flow is further provided, as shown in FIG. 7. It should be noted that in this embodiment of the present invention, after a second control event is triggered by a forwarder, an index corresponding to the event is notified to a controller by the forwarder.

The method includes the following contents.

701. When the second control event of the service data flow is triggered, the forwarder acquires a second instruction index according to the second control event, and sends the second instruction index to a controller by using second control signaling, where the second instruction index includes at least one type of index information related to a UE.

The second instruction index may further include a 5-tuple data flow table index.

A case in this embodiment of the present invention may be, for example, a field indicating aging time exists in each flow table entry, for storing expiry time corresponding to the flow table entry, and when a flow table entry expires, a second control event is triggered, and a forwarder sends an instruction index corresponding to the expiry flow table entry to a controller.

702. The controller receives the second control signaling sent by the forwarder, where the second control signaling carries a second instruction index, and the second instruction index includes at least one type of the index information related to the UE.

In this embodiment of the present invention, a controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

Embodiment 4

Figure 8:
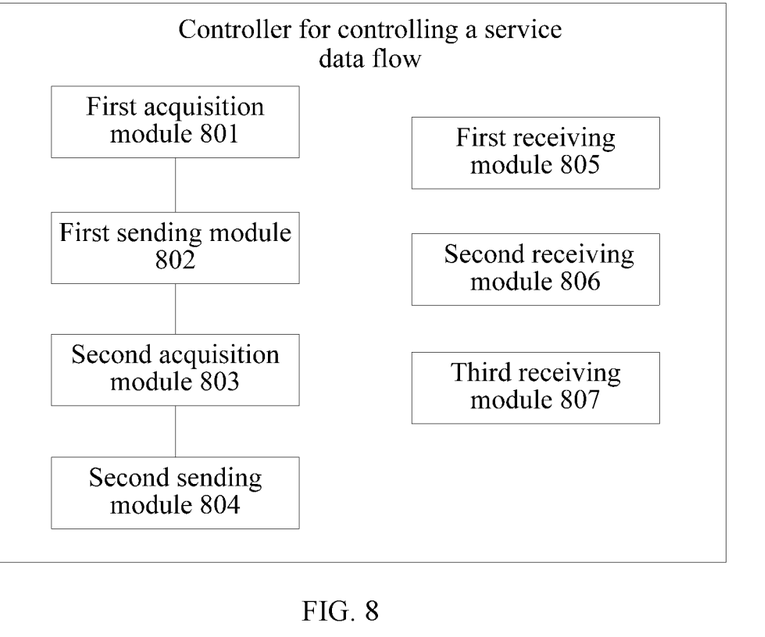
FIG. 8 is a schematic structural diagram of a controller for controlling a service data flow according to Embodiment 4 of the present invention.

This embodiment of the present invention provides a controller for controlling a service data flow. Referring to FIG. 8, the controller includes:

a first acquisition module 801, configured to acquire index information related to a UE, where the index information includes at least a user information index, a PDN connection index, a bearer index, and a service data flow table index that are related to the UE;

a first sending module 802, configured to send the index information to a forwarder by using an entry notification message;

a second acquisition module 803, configured to: when a first control event of a service data flow is triggered, acquire a first instruction index according to the first control event, where the first instruction index includes at least one type of the index information related to the UE and acquired by the first acquisition module; and a second sending module 804, configured to send the first instruction index to the forwarder by using first control signaling.

The first control event includes at least one of: a control event for user information, a control event for a PDN connection, a control event for a bearer, a control event for a service data flow, and a control event for a 5-tuple data flow table that are related to the UE.

The controller further includes:
a first receiving module 805, configured to receive the index information, returned by the forwarder, of an index number allocated by the forwarder.

The first sending module 802 includes:
a first sending unit, configured to store the index information in a preset field of the entry notification message, and send the entry notification message to the forwarder, where the preset field is a newly added field or a cookie field; and
a second sending unit, configured to store the index information in an action field of the entry notification message, and send the entry notification message to the forwarder.

The controller further includes:
a second receiving module 806, configured to receive response information returned by the forwarder, where the response information carries an operation result corresponding to the first control signaling, and the first instruction index.

The controller further includes:
a third receiving module 807, configured to receive second control signaling sent by the forwarder, where the second control signaling carries a second instruction index, and the second instruction index includes at least one type of the index information related to the UE.

In this embodiment of the present invention, a controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

Embodiment 5

Figure 9:
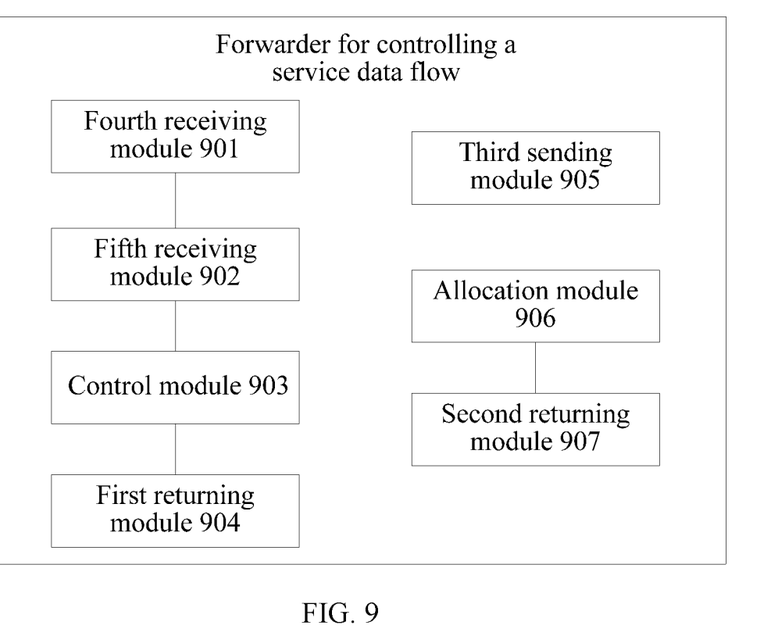
FIG. 9 is a schematic structural diagram of a forwarder for controlling a service data flow according to Embodiment 5 of the present invention.

This embodiment of the present invention provides a forwarder for controlling a service data flow. Referring to FIG. 9, the forwarder includes:
a fourth receiving module 901, configured to receive an entry notification message that carries index information related to a UE and is sent by a controller, where the index information includes at least a user information index, a PDN connection index, a bearer index, and a service data flow table index that are related to the UE;
a fifth receiving module 902, configured to receive first control signaling sent by the controller, where the first control signaling carries a first instruction index, and the first instruction index includes at least one type of the index information related to the UE; and
a control module 903, configured to perform a control operation on a service data flow according to the first instruction index.

The fourth receiving module 901 includes:
a first receiving unit, configured to receive an entry notification message sent by the controller, and extract index information from a preset field of the entry notification message, where the preset field is a newly added field or a cookie field; or
a second receiving unit, configured to receive an entry notification message sent by the controller, and extract index information from an action field of the entry notification message.

The forwarder further includes:
a first returning module 904, configured to return response information to the controller, where the response information carries an operation result corresponding to the first control signaling, and the first instruction index.

The forwarder further includes:
a third sending module 905, configured to: when a second control event of a service data flow is triggered, acquire a second instruction index according to the second control event, and send the second instruction index to the controller by using second control signaling, where the second instruction index includes at least one type of the index information related to the UE.

The forwarder further includes:
an allocation module 906, configured to allocate an index number for each index in the index information according to index numbers of various indexes stored in the forwarder; and
a second returning module 907, configured to return, to the controller, the index information of the index number allocated by the forwarder.

The index information further includes a 5-tuple data flow table index.

In this embodiment of the present invention, a controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

Embodiment 6

Figure 10:
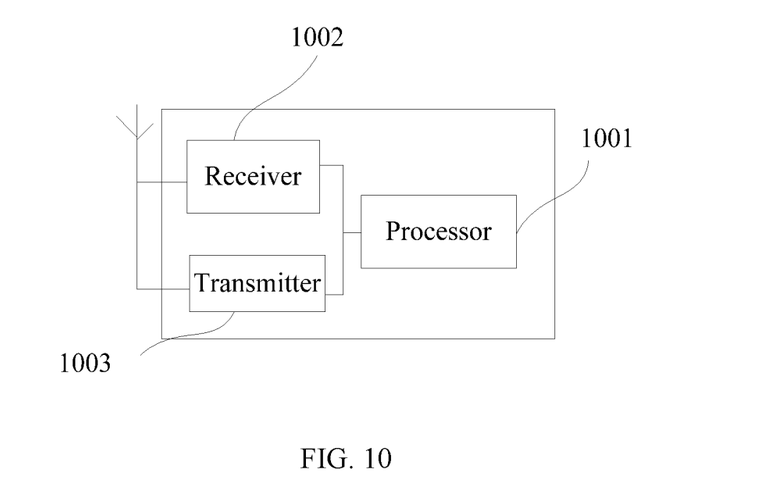
FIG. 10 is a schematic structural diagram of a controller according to Embodiment 6 of the present invention.

This embodiment of the present invention provides a controller. Referring to FIG. 10.

The controller includes: a processor 1001, a receiver 1002, and a transmitter 1003.

The receiver 1002 is configured to receive index information reported by a UE and related to the UE, where the index information includes at least a user information index, a public data network (PDN) connection index, a bearer index, and a service data flow table index that are related to the UE.

The processor 1001 is configured to: generate, according to the index information related to the UE and received by the receiver 1002, an entry notification message; and when a first control event of a service data flow is triggered, acquire a first instruction index according to the first control event, where the first instruction index includes at least one type of the index information related to the UE.

The transmitter 1003 is configured to: send the entry notification message to a forwarder; and send the first instruction index to the forwarder by using first control signaling.

The first control event includes at least one of: a control event for user information, a control event for a PDN connection, a control event for a bearer, a control event for a service data flow, and a control event for a 5-tuple data flow table that are related to the UE.

The receiver 1002 is further configured to receive the index information, returned by the forwarder, of an index number allocated by the forwarder.

The transmitter 1003 is configured to store the index information in a preset field of the entry notification message, and send the entry notification message to the forwarder, where the preset field is a newly added field or a cookie field; or the transmitter 1003 is configured to store the index information in an action field of the entry notification message, and send the entry notification message to the forwarder.

The receiver 1002 is further configured to receive response information returned by the forwarder, where the response information carries an operation result corresponding to the first control signaling, and the first instruction index.

The receiver 1002 is further configured to receive second control signaling sent by the forwarder, where the second control signaling carries a second instruction index, and the second instruction index includes at least one type of the index information related to the UE.

In this embodiment of the present invention, a controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

Embodiment 7

Figure 11:
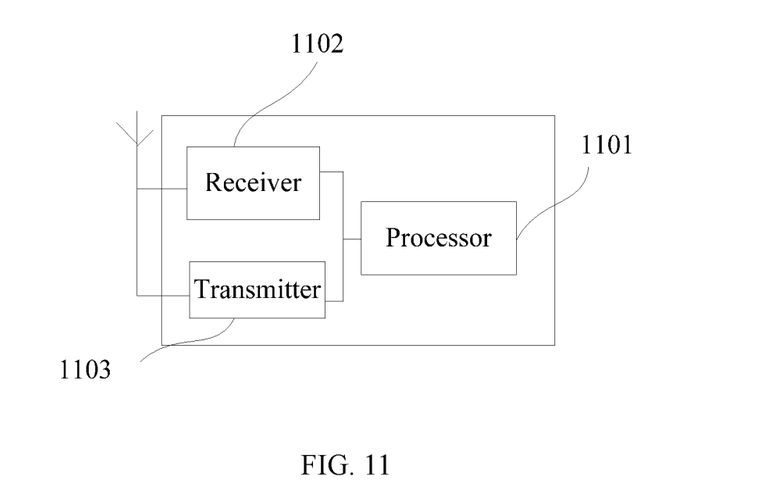
FIG. 11 is a schematic structural diagram of a forwarder according to Embodiment 7 of the present invention.

This embodiment of the present invention provides a forwarder. Referring to FIG. 11, the forwarder includes: a processor 1101 and a receiver 1102.

The receiver 1102 is configured to: receive an entry notification message that carries index information related to a UE and is sent by a controller, where the index information includes at least a user information index, a PDN connection index, a bearer index, and a service data flow table index that are related to the UE; and receive first control signaling sent by the controller, where the first control signaling carries a first instruction index, and the first instruction index includes at least one type of the index information related to the UE.

The processor 1101 is configured to perform a control operation on a service data flow according to the first instruction index.

The entry notification message sent by the controller is received, and index information is extracted from a preset field of the entry notification message, where the preset field is a newly added field or a cookie field; or the entry notification message sent by the controller is received, and index information is extracted from an action field of the entry notification message.

The forwarder further includes a transmitter 1103.

The transmitter 1103 is configured to return response information to the controller, where the response information carries an operation result corresponding to the first control signaling, and the first instruction index.

The processor 1101 is further configured to: when a second control event of a service data flow is triggered, acquire a second instruction index according to the second control event.

The transmitter 1103 is further configured to send the second instruction index to the controller by using second control signaling, where the second instruction index includes at least one type of the index information related to the UE.

The processor 1101 is further configured to allocate an index number for each index in the index information according to index numbers of various indexes stored in the forwarder.

The transmitter 1103 is further configured to return, to the controller, the index information of the index number allocated by the forwarder.

The index information further includes a 5-tuple data flow table index.

In this embodiment of the present invention, a controller maintains index information including a user information index, a PDN connection index, a bearer index, and a service data flow table index, and sends the index information to a forwarder; and when a first control event of a service data flow is triggered, sends a first instruction index to the forwarder according to the first control event, so as to instruct the forwarder to control the service data flow according to the first instruction index. A service data flow is controlled according to a granularity corresponding to an index, which reduces link overheads for controlling a service data flow, and greatly improves control efficiency.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from principle of the present invention shall fall within the protection scope of the present invention.

What is claimed is:

1. A method for controlling a service data flow, wherein the method comprises:
 receiving, by a forwarder, an entry notification message that carries index information related to a user equipment (UE) and is sent by a controller, wherein the index information comprises at least a user information index, a public data network (PDN) connection index, a bearer index, and a service data flow table index that are related to the UE;
 receiving, by the forwarder, first control signaling sent by the controller based on a first control event, wherein the first control signaling carries a first instruction index, and the first instruction index comprises at least one type of the index information related to the UE and instructions to control a service data flow with defined control granularity according to the first instruction index that includes index information related to the UE, wherein the first control event comprises at least one of: a control event for user information, a control event for a PDN connection, a control event for a bearer, a control event for a service data flow, and a control event for a 5-tuple data flow table that are related to the UE; and performing, by the forwarder, a control operation on a service data flow according to the first instruction index, wherein after the forwarder performs the control operation on the service data flow with the corresponding control granularity according to the first instruction index, returning, by the forwarder, response information to the controller, wherein the response information carries an operation result corresponding to the first control signaling, and the first instruction index, and after the receiving, by the forwarder, the entry notification message that carries the index information related to the UE sent by the controller, when a second control event of a service data flow is triggered, acquiring, by the forwarder, a second instruction index according to the second control event, and sending the second instruction index to the controller by using second control signaling, wherein the second instruction index comprises at least one type of the index information related to the UE, and wherein the second control event is different than the first control event.

2. The method according to claim 1, wherein the receiving, by the forwarder, the entry notification message that carries the index information related to the UE and is sent by a controller comprises:

receiving the entry notification message sent by the controller, and extracting index information from a preset field of the entry notification message, wherein the preset field is a newly added field or a cookie field; or receiving the entry notification message sent by the controller, and extracting index information from an action field of the entry notification message.

3. A controller for controlling a service data flow, wherein the controller comprises:

a receiver, configured to receive index information related to a user equipment (UE) from the UE, wherein the index information comprises at least a user information index, a public data network (PDN) connection index, a bearer index, and a service data flow table index that are related to the UE;

a transmitter, configured to send the index information to a forwarder by using an entry notification message; and a processor, configured to:

when a first control event of a service data flow is triggered, acquire a first instruction index according to the first control event, wherein the first instruction index comprises at least one type of the index information related to the UE, wherein the first control event comprises at least one of: a control event for user information, a control event for a PDN connection, a control event for a bearer, a control event for a service data flow, and a control event for a 5-tuple data flow table that are related to the UE;

wherein the transmitter is further configured to send the first instruction index to the forwarder by using first control signaling to control the service data flow with defined control granularity according to the first instruction index that includes index information related to the UE, wherein the receiver is further configured to receive response information returned by the forwarder, wherein the response information carries an operation result corresponding to the first control signaling, and the first instruction index, and wherein the receiver is further configured to receive second control signaling sent by the forwarder when a second control event of a service data flow is triggered, wherein the second control signaling carries a second instruction index, wherein the second instruction index comprises at least one type of the index information related to the UE, and wherein the second control event is different than the first control event.

4. The controller according to claim 3, wherein the receiver is further configured to receive the index information, returned by the forwarder, of an index number allocated by the forwarder.

5. The controller according to claim 3, wherein the processor is further configured to store the index information in a preset field of the entry notification message, the transmitter is further configured to send the entry notification message to the forwarder, wherein the preset field is a newly added field or a cookie field;

the processor is further configured to store the index information in an action field of the entry notification message, and the transmitter is further configured to send the entry notification message to the forwarder.

6. A forwarder for controlling a service data flow, wherein the forwarder comprises:

a receiver, configured to:

receive an entry notification message that carries index information related to a user equipment (UE) and is sent by a controller, wherein the index information comprises at least a user information index, a public data network connection index, a bearer index, and a service data flow table index that are related to the UE;

receive first control signaling sent by the controller based on a first control event, wherein the first control signaling carries a first instruction index, and the first instruction index comprises at least one type of the index information related to the UE and instructions to control a service data flow with defined control granularity according to the first instruction index that includes index information related to the UE, wherein the first control event comprises at least one of: a control event for user information, a control event for a PDN connection, a control event for a bearer, a control event for a service data flow, and a control event for a 5-tuple data flow table that are related to the UE;

a processor, configured to perform a control operation on a service data flow according to the first instruction index; and a transmitter, configured to return response information to the controller, wherein the response information carries an operation result corresponding to the first control signaling, and the first instruction index, wherein, the processor is further configured to, when a second control event of a service data flow is triggered, acquire a second instruction index according to the second control event, and the transmitter is further configured to send the second instruction index to the controller by using second control signaling, wherein the second instruction index comprises at least one type of the index information related to the UE, and wherein the second control event is different than the first control event.

7. The forwarder according to claim 6, wherein the receiver is further configured to receive the entry notification message sent by the controller, and the processor is further configured to extract index information from a preset field of the entry notification message, wherein the preset field is a newly added field or a cookie field; or the receiver is further configured to receive an entry notification message sent by the controller, and the processor is further configured to extract index information from an action field of the entry notification message.

8. The forwarder according to claim 6, wherein the processor is further configured to allocate, an index number for each index in the index information according to index numbers of various indexes stored in the forwarder; and the forwarder further comprises: a transmitter, configured to return, to the controller, the index information of the index number allocated by the forwarder.

* * * * *